Feb. 22, 1927.

E. F. DAUTEUIL 1,618,919

MUD GUARD FOR MOTOR VEHICLES

Filed March 30, 1923    2 Sheets-Sheet 2

INVENTOR
EDOUARD F. DAUTEUIL
BY
ATTORNEY

Patented Feb. 22, 1927.

1,618,919

UNITED STATES PATENT OFFICE.

EDOUARD FERNAND DAUTEUIL, OF ST.-DENIS, FRANCE.

MUD GUARD FOR MOTOR VEHICLES.

Application filed March 30, 1923, Serial No. 628,882, and in France December 13, 1922.

This invention has for its object a mud-guard for the wheels of motor vehicles and the like, characterized by the combination:

(a) of a collar, arranged concentric with the hub and immobilized by means of arms secured to supports attached to the axle or to the steering swivel;

(b) of a mud-guard proper, mounted on a ring concentric with this collar, capable of rotating on the latter and brought back to its normal position by springs or by its own weight.

According to a first form of construction the improved mud-guard comprises:

(a) Arms rigidly secured on the steering swivel on the inner face of the wheel and suitably bent at their free ends so that the latter present themselves in front of the outer face of the said wheel;

(b) A circular frame arranged concentric with the hub of the wheel and having radial arms permitting the frame to be attached to the arms on the steering swivel and a central collar fitted either directly on the end of the axle, or on the outer race of which of a ball bearing the inner race is secured on the hub cap of the wheel;

(c) A member supporting the rubber strip and constituted by a segment rigid with a ring mounted with a slight friction on the central collar of the circular frame, this segment and the rubber strip it supports being brought back in the vertical position by one or more springs attached to the said ring and to the circular frame. This construction permits the oscillation of the mud-guard in one direction or the other when the rubber strip is pressed between the pavement and the wheel. The circular frame has its outer edge curved and engages a groove of the segment carrying the rubber strip and is provided with a hook engaging with the collar of the said ring which latter is thus supported concentric with the hub of the wheel and follows the same in all its displacements, whilst being held against any transverse movement and, consequently, against any accidental disengagement.

When the mud-guard forming the subject matter of this invention is adapted to be carried by the steering swivel of the wheel, instead of the hub as above, the central collar of the circular frame is freely fitted on an extension of the axle without interposition of ball bearing.

The improved mud-guard comprises, moreover, a device which serves to hold it in the raised position and is constituted by a small spring pin arranged at the upper part of the circular frame and fitting in a housing of the segment carrying the rubber strip.

In the second form of construction the mud-guard presents the following characteristic features:

1. The collar, concentric with the hub is, preferably, mounted on the latter by means of a ball bearing and is rigidly immobilized by one or more vertical arms secured to the said collar and on one or more supporting arms secured to the axle.

2. The ring carrying the strip of rubber or other material is mounted concentric with the fixed collar, so as to be capable of rotating with a slight friction on the said collar to which it is connected by guide members preventing its accidental disengagement and which can be constituted so as to form a spring in order to avoid shocks and noise. This movable ring carries the point of attachment of a spring secured on the vertical arm rigid with the collar and adapted to bring back the mud-guard in its normal position;

3. The protecting strip of rubber or like material is lined, on its inner face, with a metallic blade placed opposite the rim and is provided, on its outer face, with projecting metallic rivets, for the purpose of strengthening this strip at the place where the latter can be pressed between the rim and the curb-stone of a pavement and, consequently, of avoiding any damage to the said strip.

In order that the invention may be clearly understood, the improved mud-guard will be described hereafter with reference to the accompanying drawing in which.

Figure 2:
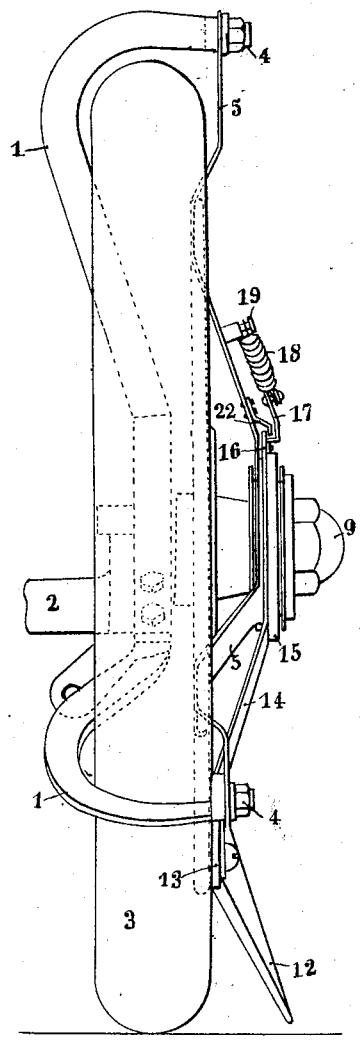
Fig. 2 is a side view.
Figure 3:
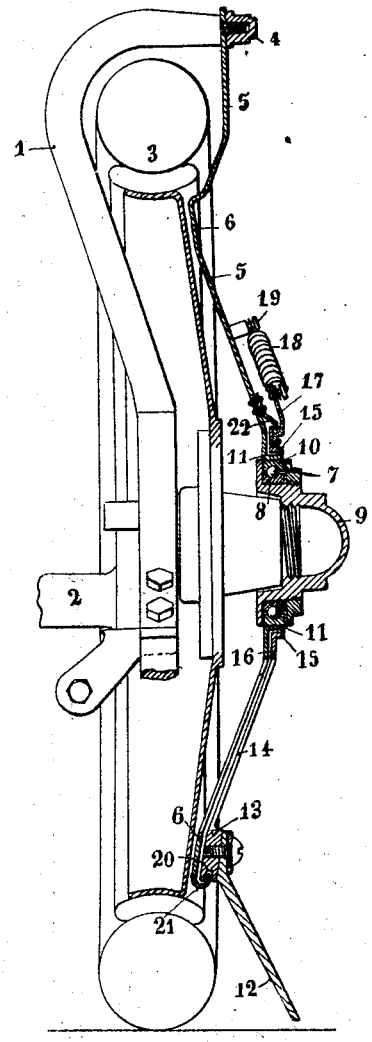
Fig. 3 is a vertical section made according to line A—A of Fig. 1.

As shown in the accompanying drawing, the improved mud-guard has a number of arms 1 rigidly secured at one of their ends on the steering swivel 2 of the wheel 3 and suitably curved at their free ends so that the latter are located slightly in front of the outer face of the wheel as shown in Figs. 2 and 3.

On these arms are rigidly secured, by means of bolts 4, the arms 5 of a circular frame 6 which, in the example shown, is supported concentric with hub of the wheel and on the latter by means of a ball bearing 7, the inner race 8 of which is mounted on the axle cap 9 or on the hub itself and the outer race 10 is fitted in a collar 11 rigid with the frame 6.

This whole constitutes the support of the mud-guard proper which comprises a rubber strip 12 secured by means of screws on a sheet iron member cut out in the shape of a segment 13 and attached by arms 14, to a ring 15 which is fitted with a slight friction on the collar 11 rigid with the fixed circular frame 6, as clearly shown in Fig. 3.

The ring 15 which has a circular ledge 16 is provided, on the opposite side to the rubber strip 12 and in the vertical axis of the latter, with a lug 17 to which are attached the ends of coil springs 18 the opposite ends of which are secured at 19 on the fixed circular frame 6.

Figure 1:
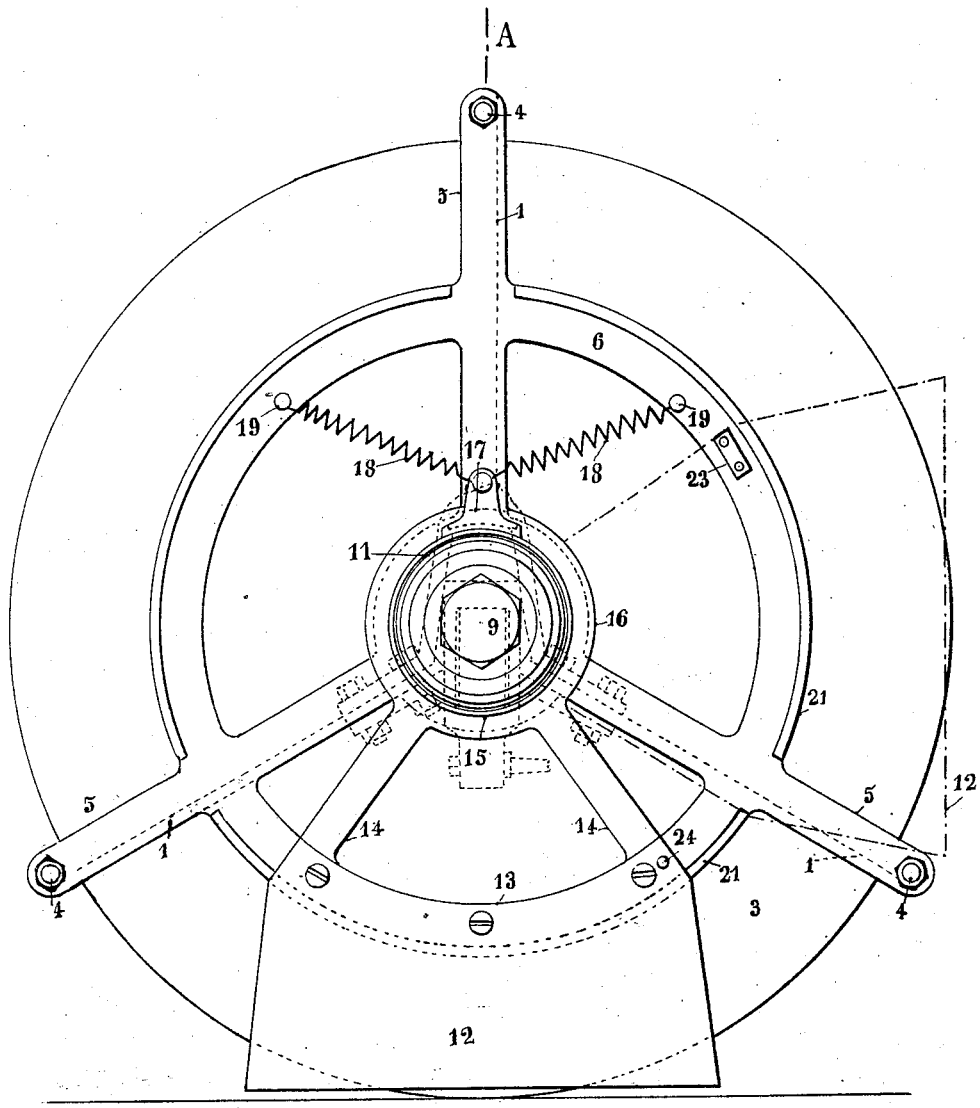
Fig. 1 is a front elevation of the mud-guard mounted on a wheel of a motor vehicle.

These springs are adapted to hold the rubber strip 12 opposite the lower part of the tyre of the wheel, as shown in Fig. 1, and to bring it back in this position if, for any cause whatever, for instance by pressure between the curb-stone of a pavement and a tyre and the said strip drawn along according to a certain angle in the movement of rotation of the wheel.

The segment 13 on which is secured the rubber strip 12 is provided with a groove 20 in which is fitted the U-shaped edge 21 of the circular frame 6 which carries on the vertical arm 5 a hook 22 engaging with the ledge 16 of the ring 15.

It results from the above described arrangement that the support of the mud-guard formed by the arms 1 and the circular frame 6, constitutes an undistortable whole taking a bearing, at its center, on the wheel through the ball bearing 7 and on the steering swivel, through the arms 1, so that the mud-guard mounted on the central collar 11 of the said frame 6, follows, with the latter, all the displacements of the wheel.

It will be understood, on the other hand, that the engagement of the curved edge 21 of the frame 6 in the groove 20 of the segment 13 carrying the rubber strip 12, as well as the engagement of the hook 22 of the said frame with the ledge of the ring 15 of the said segment ensure the intimate connection of the frame 6 with this segment and its rubber strip and prevent, consequently, any accidental displacement of these parts in the transverse direction under the influence of shocks or from any other cause.

This connecting device of the mud-guard with its support also ensures the guiding of the rubber strip, when the latter is pressed between the pavement and the tyre and is carried along by the wheel in an angular rotary movement of greater or less amplitude about the collar 11 of the frame 6.

The above described mud-guard is also provided with a device which permits the driver to lift the rubber strip 12 in the position shown in dotted lines in Fig. 1 in dry weather or when the vehicle runs outside a town or an inhabited place.

This device consists of a spring pin 23 secured on the frame 6, at a suitable point of its upper part and adapted to fit in a hole 24 or suitable housing provided in the segment 13 for holding the latter and the rubber band it carries in the raised position.

The constructional arrangement above described is, of course, given by way of example only; the forms, materials and dimensions as well as the details of construction may be modified without departing thereby from the principle of the invention.

The ball bearing interposed between the fixed collar 1 and the hub of the wheel might, for instance, be done away with and the collar 11 might be supported by a number of arms on several arms secured to the axle or on the steering swivel.

Claim:

A mud-guard for the wheels of motor vehicles and the like, comprising: supports secured on the axle,—arms secured on the said supports,—a circular frame rigid with the said arms,—a collar also rigid with these arms and concentric with the hub of the wheel,—a ball bearing between the said hub and the collar,—a ring concentrically mounted on the collar and capable of rotating on the latter,—arms and a segment rigid with the ring,—a protecting strip secured on the segment,—springs bringing back to its normal position this ring and the protecting strip it carries,—a groove in the outer edge of the segment carrying the protecting strip,—a ledge of the circular fixed frame fitted in the said groove,—a hook rigid with the fixed frame adapted for engaging on the other hand with a ledge of the ring on which is mounted the protecting strip.

The foregoing specification of my "mud-guard for motor vehicles" signed by me this 6th day of March, 1923.

EDOUARD FERNAND DAUTEUIL.